Figure 11:
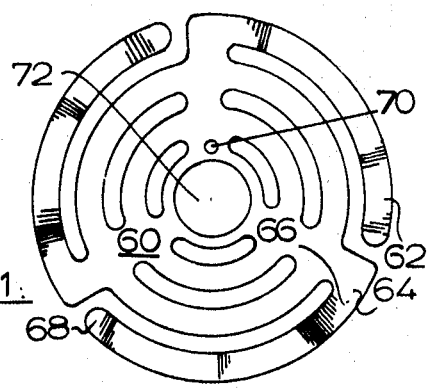

United States Patent

[11] 3,589,703

| [72] | Inventor | Donald Brookman<br>Helsby, England |
|---|---|---|
| [21] | Appl. No. | 716,198 |
| [22] | Filed | Mar. 26, 1968 |
| [45] | Patented | June 29, 1971 |
| [73] | Assignee | The Metallic Valve Company Limited<br>Birkenhead, Cheshire, England |
| [32] | Priority | Mar. 28, 1965 |
| [33] | | England |
| [31] | | 13926/67 |

[54] DISC VALVES
10 Claims, 27 Drawing Figs.

| [52] | U.S. Cl. | 267/162 |
|---|---|---|
| [51] | Int. Cl. | F16f 1/22 |
| [50] | Field of Search | 267/162,<br>163, 156, 161; 137/516.23 |

[56] References Cited
UNITED STATES PATENTS
3,428,682   2/1969   Kohler................ 137/516—23

*Primary Examiner*—James B. Marbert
*Attorney*—Sughrue, Rothwell, Mion, Zinn & MacPeak ABSTRACT: Spring means for urging a valve plate against a valve seat in an annular check valve, one disclosed each comprising at least two sprint plates adapted to engage one another in a valve, each plate having a plane portion out of which are bent arcuate spring portions of each of which the axial direction of bending, the peripheral direction, and the inner and outer radii are interrelated to substantially avoid the risk of spring portions of adjacent plates becoming entangled with one another in a valve.

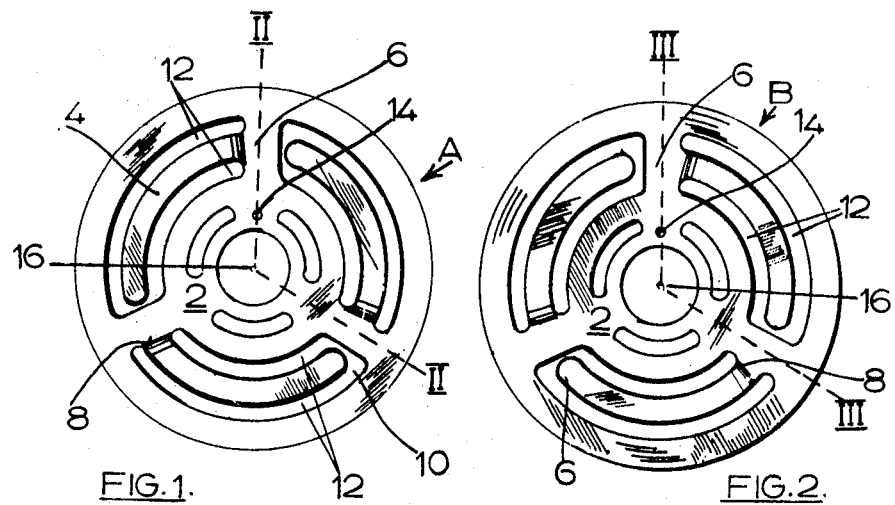
FIG.1.    FIG.2.
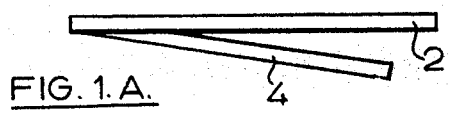
FIG.1.A.    FIG.2.A
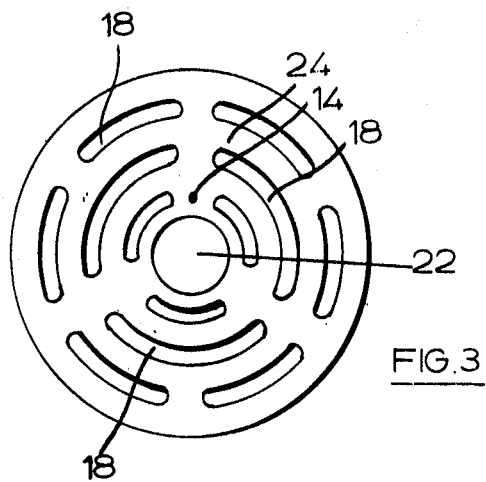
FIG.3

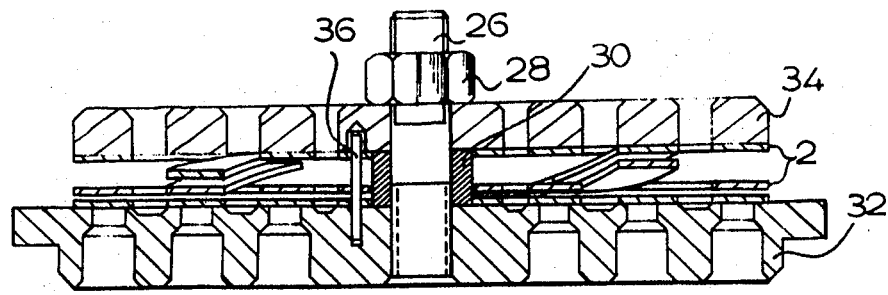
FIG. 4.
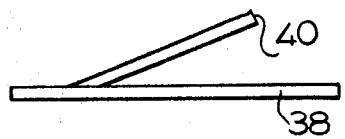
FIG. 8.A
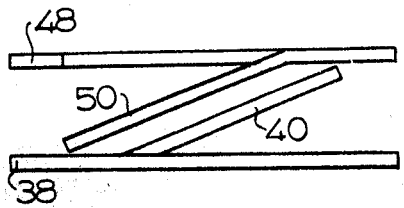
FIG. 8.B
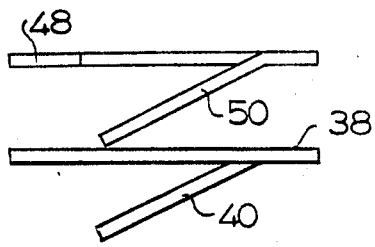
FIG. 8.C
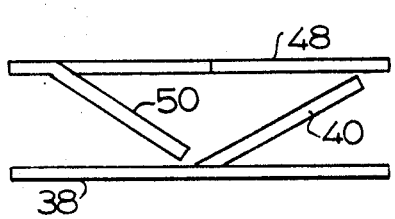
FIG. 9.A
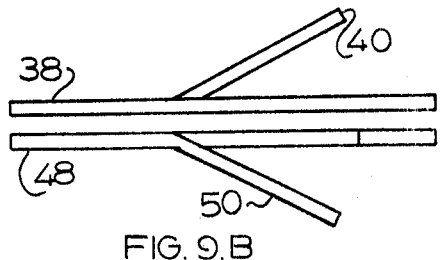
FIG. 9.B PATENTED JUN29 1971
3,589,703
SHEET 3 OF 6
FIG.5.A.
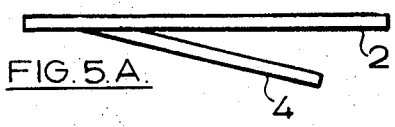
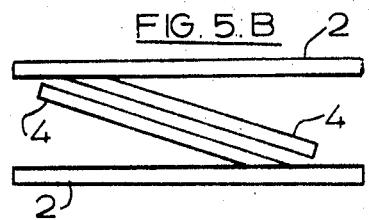
FIG.5.B
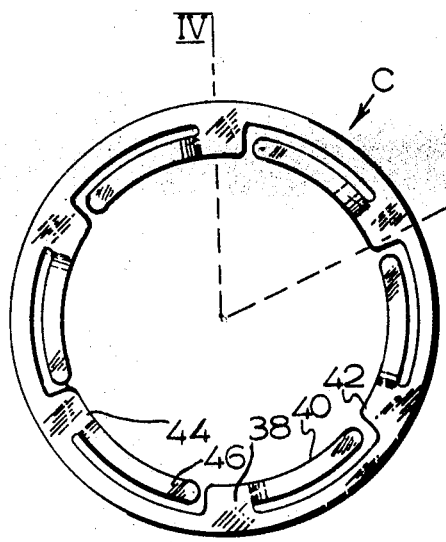
FIG 6
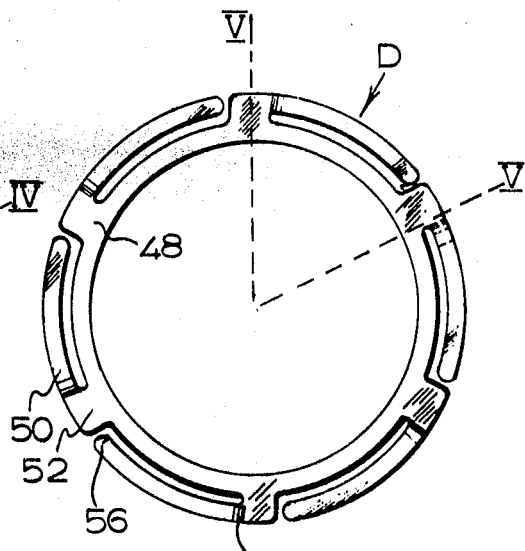
FIG 7
FIG 6A
FIG 7A

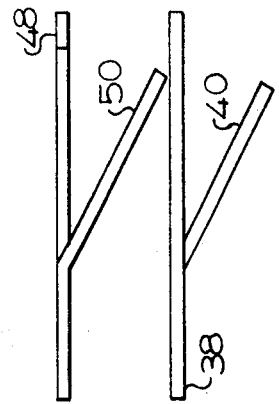
FIG.10A
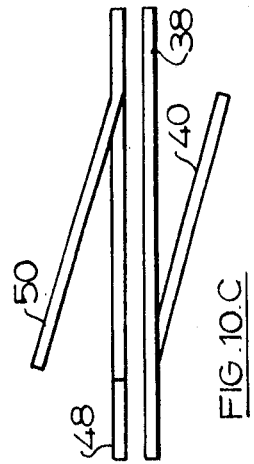
FIG.10.C
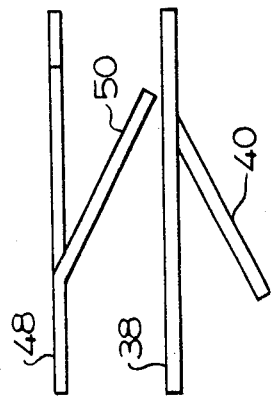
FIG.9C
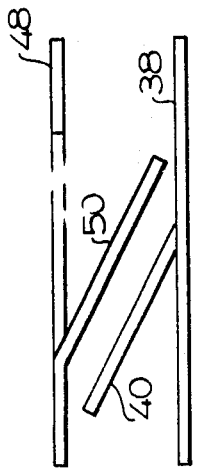
FIG.10B

DISC VALVES

The present invention relates to valves and more particularly to self-acting single and multiringed annular check valves and to component parts thereof.

A typical single or multiringed annular check valve comprises a valve seat, a valve guard fixedly spaced a predetermined distance away from the valve seat, a valve plate for abutment against the valve seat to close the valve, and spring means for urging the valve plate against the valve seat. The spring means may take the form of a spring plate or a plurality of compression springs that act between the valve plate and the valve guard. In certain cases a cushion or damping plate may be provided adjacent the valve guard and additional springs may act between the cushion plate and the valve guard to damp movement of the valve plate in a valve-opening direction and to avoid chatter.

According to one aspect of the present invention it is envisaged replacing such spring means by two or more spring plates that engage one another and each of which is provided with a plurality of arcuate spring portions that are bent out of the plane of that plate.

In each spring plate, so far as the arcuate spring portions are concerned, there are three primary variables. These variables are (a) the axial direction in which the spring portions are bent from the plane of the plate, (b) the circumferential direction in which each spring portion extends from its base at which it joins the plane part of the plate to its tip, and (c) the inner and outer radii defining the annular zone or zones in which they lie. These variables—the axial direction, circumferential direction and radii—are preferably so chosen that when the spring plates are assembled in contact with one another in a valve, there is substantially no risk of the arcuate spring portions of any one plate becoming entangled with arcuate spring portions of an adjacent spring plate.

For example, if the radii of the arcuate spring portions on one spring plate are different from the radii of the arcuate spring portions on the adjacent spring plate by an amount such that the arcuate spring portions do not overlay each other. The spring plates, when assembled in a valve, may have their arcuate spring portions extending in the same or in the opposite axial direction. In either case the spring portion may extend in the same or in the opposite circumferential direction and means for restraining annular displacement of one spring plate relative to its neighbor are not required. However, if the radii of the arcuate spring portions on two adjacent spring plates are the same, then means for restraining angular displacement of one spring plate relatively to its neighbor must be provided to avoid spring portions on one plate becoming entangled with spring portions on a neighboring plate.

In addition the arcuate spring portions are preferably spaced radially from the remainder of the plate. This radial spacing prevents the spring portions catching with the plate in which they are formed and assists gas flow through the valve when used with a valve plate having similar arcuate slots.

The spring plates can be assembled in a valve either with their plane portions abutting one another or with at least some of the arcuate spring portions of one engaging the plane portion of another, but should preferably not be assembled with the arcuate spring portions of one plate engaging the arcuate spring portions of another. Where the plane parts of two spring plates abut one another, the arcuate spring portions of one spring plate will abut the valve plate and the arcuate spring portions of the other may abut the valve guard or may abut a cushion plate.

The spring characteristics of the arcuate spring portions of the two spring plates may be the same or may be different; for example the arcuate spring portions of the disc adjacent the valve plate may be longer peripherally than those of the other spring plate and thus have a correspondingly weaker spring action so that, as the valve plate is displaced away from the valve seat, the longer spring portions are urged towards the plane of their plate before the shorter arcuate spring portions of the other plate are similarly urged. Under these conditions a damping action can be provided. If desired a third spring plate can be added either with its plane portion abutting the valve plate or abutting a cushion plate or the valve guard. Any desired number of spring plates greater than two can be employed.

It is not essential for the arcuate spring portions on any one spring plate to be of all the same peripheral length or be bent initially out of the plane of the rest of the plate to the same extent; nor is it necessary for all the arcuate spring portions on any one plate to lie within the same annulus; nor need they all, in any one annulus, extend in the same peripheral direction.

For example a spring plate according to the invention may include within the same annulus some relatively longer spring portions and some relatively shorter spring portions. Thus, the total length of two such opposed relatively short spring portions may be equal to the length of one ordinary arcuate spring portion.

These relatively short spring portions have spring characteristics different from those of the longer spring portions in the same plate and thus provide a useful supplement to the spring effect of these longer spring portions. In particular the short spring portions are effective when the longer spring portions are at their most effective that is when two spring plates are very close together and the spring portions thus nearly in the plane of the plate.

The spring plates may be of annular or of disc form.

If of annular form the spring portions may be positioned on the inner or on the outer periphery of the annular spring zone. One spring plate may have the spring portions positioned on the outer periphery of an annulus, and be used in conjunction with another spring plate having the spring portions positioned on the inner periphery of the annulus.

If of disc form the outer radius of the annular zone containing the spring portions may be less than the radius of the disc.

Disc valves according to the present invention have the following advantages:-

There is a fairly wide choice of dimensions possible for the spring portions. Thus, these portions can be dimensioned to have the most favorable spring characteristics and damping properties. Further, with spring plates according to the present invention the applied pressure is evenly distributed over the surface of the valve plate. In addition, when in use, there is little or no tendency for the valve plates to rotate or for the valve plate to be rotated.

The invention will be further illustrated by way of example, with reference to any one of the accompanying drawings in which, FIG. 1 is a plan view of one spring plate to be used in a disc valve according to the invention.

Figure 12:
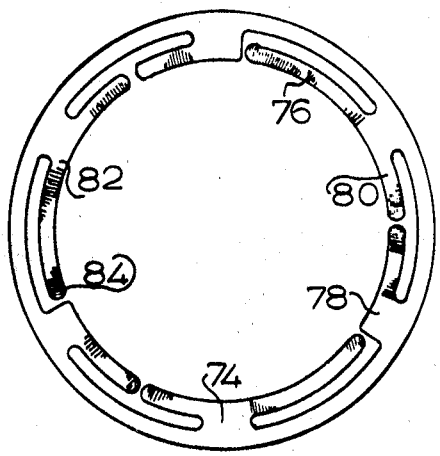
Figure 13:
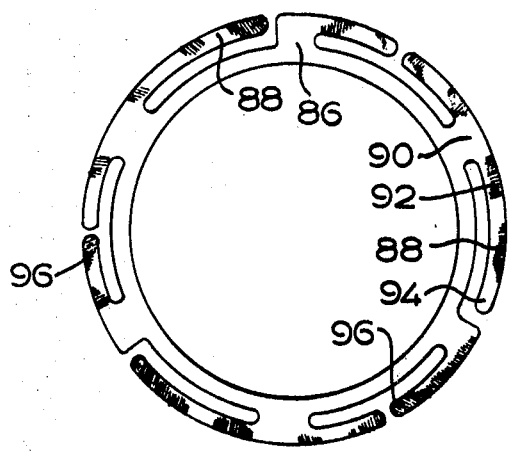
Figure 14:
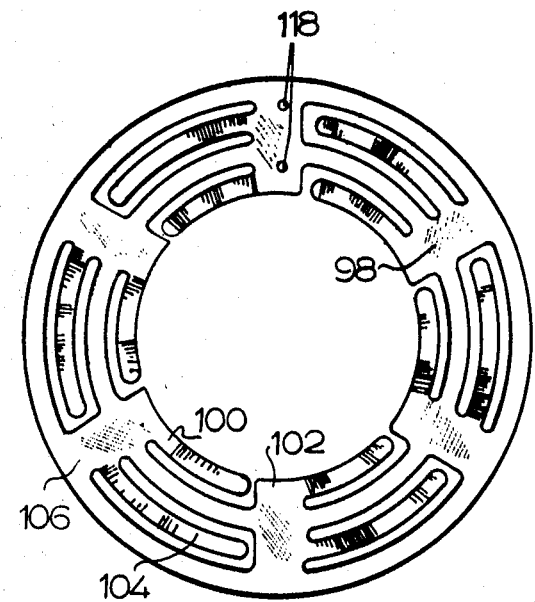

FIG. 1a is a developed detail elevation of the portion between the lines 11–11 looking in the direction of the arrow A in FIG. 1, FIG. 2 is a plan view of a spring plate suitable for use with the spring plate of FIG. 1, FIG. 2a is a developed detail elevation of the portion between the lines 111–111 looking in the direction of the arrow B in FIG. 2, FIG. 3 is a plan view of a valve plate suitable for use with the spring plates of FIGS. 1 and 2, FIG. 4 is a section through a disc valve according to the present invention, FIG. 5a illustrates diagrammatically, in developed detail elevation, the relative positioning of the spring plates of FIGS. 1 and 2 in a disc valve, FIG. 5b illustrates diagrammatically a further possible positioning of the spring plates of FIGS. 1 and 2 in a disc valve, FIG. 6 is a plan view of an annular spring plate to be used in a disc valve according to the invention, FIG. 6a is a developed detail elevation of the portion between the lines 1V–1V looking in the direction of the arrow C in FIG. 6, FIG. 7 is a plan view of an annular spring plate suitable for use with the spring plate of FIG. 6, FIG. 7a is a developed detail elevation of the portion between the lines V-V looking in the direction of the arrow D in FIG. 7, FIG. 8a shows, diagrammatically and in developed detail elevation, the relative position of two spring plates in a disc valve according to the present invention, FIG. 8b shows, again in developed detail elevation, the relative positions of two spring plates in a disc valve according to the invention, FIG. 8c is a view similar to the view of FIG. 8a, FIG. 9a is a view similar to FIG. 8a, FIG. 9b is a view similar to FIG. 8a, FIG. 9c is a view similar to FIG. 8a, FIG. 10a is a view similar to FIG. 8a, FIG. 10b is a view similar to FIG. 8a, FIG. 10c is a view similar to FIG. 8a, FIG. 11 is a plan view of a spring plate used in a disc valve according to the invention, FIG. 12 is a plan view of a further spring plate suitable for use in a disc valve according to the present invention, FIG. 13 is a plan view of a spring plate suitable for use with a spring plate of FIG. 12, FIG. 14 is a plan view of a spring plate to be used in a disc valve according to the invention.

Figure 15:
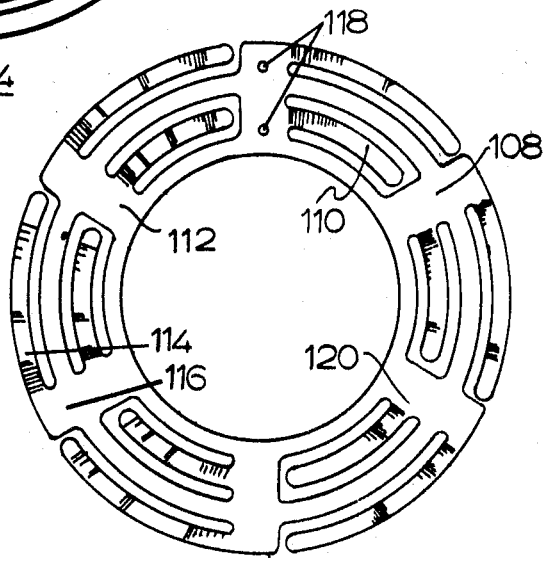
Figure 16:
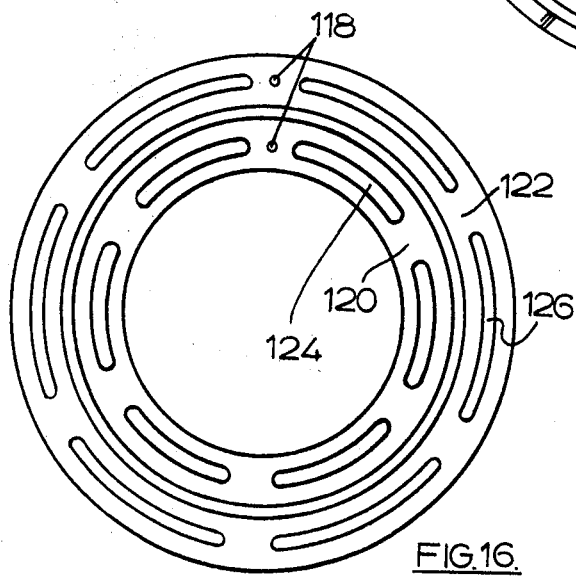

FIG. 15 is a plan view of a spring plate, suitable for use with a spring plate of FIG. 14, FIG. 16 is a plan view of two annular valve plates, suitable for use in a disc valve with the spring plates of FIGS. 14 and 15.

Referring to the drawings FIG. 1 shows a spring plate 2, having arcuate spring portions 4 positioned in an arcuate zone 6. Each spring portion 4 has a base 8 and a tip 10 and is separated from the remainder of the plate 2 by spaces 12. The disc 2, is also provided with an offcenter hole 14 and a center hole 16. The hole 14 receives a retaining pin when the plate 2 is in position in a disc valve. The central hole 16 fits around the shank or stem of a disc valve. FIG. 1a illustrates the bending of the arcuate spring portion 4 from the plane of the disc 2. The disc spring plate of FIG. 2 is the spring plate of FIG. 1 turned over. The spring plates of FIG. 1 and FIG. 2 are each illustrated in a position in which they may be used in a disc valve according to the present invention.

In the valve plate of FIG. 3, there are openings 18, to permit the passage of gas, an offcenter hole 14 and a central hole 22. In a disc valve according to the present invention the spring portions 4 of the spring plate 2 of FIG. 1 or the spring plate of FIG. 2 have the same radius as the arcuate zone 24 of the valve plate of FIG. 3 and thus, in certain relative positions of the spring plates 2, contact the arcuate zone 24.

FIG. 4 is a section through a disc valve according to the present invention. The disc valve comprises a center stud 26, a retaining nut 28, a guide washer 30, a valve seat 32, a guard plate 34, a valve plate as in FIG. 3 and spring plates 2 as illustrated in FIGS. 1 and 2. The disc valve also has a retaining pin 36. This pin retains the spring plate and the valve plate in their relative positions.

The spring portions 4 of one spring plate 2 are at the same radius as the spring portions 4 of the companion spring plate 2. Thus, means, for example the pin 35, for restraining annular displacement of one plate relative to its neighbor must be provided. FIGS. 5a and 5b illustrate two possible positions for the spring plates illustrated in FIGS. 1 and 2 in a disc valve according to the present invention. FIG. 5a illustrates the use of two spring plates, each spring portion of each spring plate having the same radius, but different circumferential directions and different axial displacements. In FIG. 5a the spring portion of each plate points away from the other, in FIG. 5b the spring portions points towards each other. In a disc valve, such as illustrated in FIG. 4, the pin 36, will prevent the spring plates engaging one another and thus failing to function properly.

FIG. 6 illustrates an annular spring plate 38 having arcuate spring portions 40 position in an annular zone 42 on the inner periphery of the annulus. Each spring portion 40 has a base 44 and a tip 46. FIG. 6a illustrates the position of the arcuate spring portions 40 in relation to the plane of the plate 38. FIG. 7 illustrates a spring plate 48 to be used with the spring plate 38 illustrated in FIG. 7 in a disc valve according to the present invention. This disc plate 48 has arcuate spring portions 50 positioned in an arcuate zone 52 on the external periphery of the plate 48. Each spring portion 50 has a base 54 and a tip 56. FIG. 7a illustrates the position of an arcuate spring portion 50 in relation to the plane of the plate.

The advantage of having the zones 42 and 52 of different radii is that one spring plate may be placed on top of the other indiscriminately. The relative positions of the spring portions in the resulting coaxial position is not important because the spring portions of the first plate contact a continuous annular portion of the second plate and the spring portions of the second plate contact continuous annular portion of the first plate. The spring portions of one plate do not become entangled with the spring portions of the other plate.

FIGS. 8a, 8b and 8c illustrate three of the possible ways in which the spring plates of FIGS. 6 and 7 may be put together in a disc valve according to the present invention. In FIG. 8a the spring portions 40 and 50 have different axial directions, different circumferential directions and different radii. FIG. 8a may be considered to illustrate the back-to-back position, that is the spring portions 40 and 50 point away from each other.

In FIG. 8b is illustrated the face-to-face position of the two same spring plates. Here again the axial and circumferential direction of the spring portions 40 and 50, and their radii are different. FIG. 8c shows the same two spring plates with the axial direction of the arcuate spring portion 40 and 50 the same and the circumferential direction the same. The radii will remain different.

FIGS. 9a 9b and 9c illustrate some of the possible positions of the two spring plates of FIGS. 6 and 7 but in which the arcuate spring portions 50 have been repositioned so that they point in the opposite direction to that illustrated in FIG. 7a. FIG. 9a is the face-to-face position and FIG. 9b the back-to-back position. The axial directions of the spring portions 40 and 50 are opposite but the circumferential directions are the same. The radii, of course, remain different.

FIGS. 10a, 10b and 10c illustrate some of the possible positions of the spring plates 38 and 48 illustrated in FIGS. 6 and 7 but in which both sets of arcuate spring portions 40 and 50 have been repositioned so that they point in the opposite direction to that illustrated in FIGS. 6a and 7a. FIGS. 10a to 10c are similar to FIGS. 8a to 8c.

FIGS. 11 to 15 illustrate further spring plates that may be used in disc valves according to the present invention. The spring plate of FIG. 11 may be used in a disc valve with one or both of the spring plates of FIGS. 1 and 2.

The spring plate 60 of FIG. 11 has arcuate spring portions 62 positioned in an arcuate zone 64 on the outer periphery of the disc. The spring portions 62 have bases 66 and tips 68. In addition the spring plate 60 has a hole 70 for a locating pin and a central hole 72 to accommodate the guide washer of a disc valve.

FIG. 12 illustrates an annular spring plate 74 having relatively long arcuate spring portions 76 positioned in an arcuate zone 78. In addition the spring plate 74 has relatively short spring portions 80, also in the annular zone 78. The annular spring portions 76, have bases 82 and tips 84. The spring plate 86 shown in FIG. 13 has spring portions 88 positioned in an arcuate zone 90 on the periphery of the annulus. The spring portions 88 have bases 92 and tips 94. In addition to the relatively long spring portion 88 the annular spring plate 86 has relatively short spring portions 96 positioned in the annular zone 90. The plates shown in FIGS. 12 and 13 make up a pair of disc valves according to the present invention. These plates have the advantage that when they are very close together and the spring characteristics of the relatively long spring portions are thus at their greatest, the relatively short spring portions are also effective. Thus the springing effect is progressively greater as the spring plates are moved nearer on one another. At maximum separation of the plates the relatively short spring portions do not necessarily contact the companion spring plate, but they may do so if required.

A spring plate such as illustrated in FIG. 6 may, in a disc valve according to the present invention, be combined with a similar spring plate that is of such a diameter that it fits inside the spring plate of FIG. 6. FIGS. 14 and 15 illustrate an embodiment of a spring plate in which such separate spring plates, one inside the other, are combined to produce a single spring plate. The spring plate 98 of FIG. 14 has arcuate spring portions 100 positioned in an arcuate zone 102 and arcuate spring portions 104 positioned in an annular zone 106. The plate 108 illustrated in FIG. 15 has annular spring portions 110 position in an arcuate zone 112 and arcuate spring portions 114 position in an arcuate zone 116. The spring plates of FIGS. 14 and 15 are provided with holes 118 adapted to receive a retaining pin.

FIG. 15 illustrates two concentric valve plates 120 and 122 having slots 124 and 126 that may be used in a disc valve fitted with the spring plates illustrated in FIGS. 14 and 15. Each of these valve plates is provided with holes 118 to receive retaining pins.

The order and number of the spring plates in a disc valve according to the present invention is not important. Although pairs of spring plates are illustrated any number of similar or different plates may be used between the guard plate and the valve plate. It is only necessary to ensure that the spring portions of one plate do not interfere with and prevent the effective operation of the spring portions of a neighboring plate. This can be ensured by selection of the axial direction of the spring plate, in which the spring portions are bent from the plane of the spring plates, the circumferential direction of each spring portion in the plates and the radii defining the annular zones in which the spring portions occur.

The spring plates may be made of spring steel or the like resilient material.

I claim:

1. In an annular check valve in which a valve plate is urged against a valve seat by spring means disposed between the valve plate and a fixed abutment, said abutment normally in the form of a guardplate, the improvement comprising a set of two spring plates forming said spring means, each of said spring plates formed with a plane portion and having a plurality of spring portions that are bent out of the plane portion of said plate, said spring plates being arranged with said spring portions of each spring plate directed toward the other spring plate so that the plane portion of one said spring plate engages said valve plate and the plane portion of the other spring plate engages said abutment.

2. A valve according to claim 1 in which said spring portions are arcuate and the radii of the arcuate spring portions of one spring plate are different from the radii of the arcuate spring portions of the other spring plate of the set by an amount such that the arcuate spring portions do not radially overlap each other.

3. A valve according to claim 2 in which said spring portions are arcuate and the spring portions of the two spring plates extend in the same circumferential direction.

4. A valve according to claim 2 in which said spring portions are arcuate and the spring portions of the two spring plates extend in opposite circumferential directions.

5. A valve according to claim 1 in which said spring portions are arcuate and the radii of the arcuate spring portions of the two adjacent spring plates of a set are the same, and means being provided for restraining angular displacement of one spring plate relative to the other.

6. A valve according to claim 1 in which said arcuate spring portions of a set of two said spring plates have different spring characteristics.

7. A valve according to claim 6 in which the arcuate spring portions of one spring plate are peripherally longer than those of the other spring plate.

8. A valve according to claim 6 in which at least one of the spring plates includes some peripherally relatively longer arcuate spring portions and some peripherally shorter arcuate spring portions.

9. A valve according to claim 1 in which at least two such sets of spring plates are disposed between the valve plate and the abutment.

10. A valve according to claim 1 further comprising, a guide pin extending perpendicularly to and passing through said valve plate, one end of said guide pin engaging said abutment, whereby said valve plate is prevented from rotating.

UNITED STATES PATENT OFFICE
CERTIFICATE OF CORRECTION

Patent No. 3,589,703  Dated June 29, 1971

Inventor(s) Donald Brookman

It is certified that error appears in the above-identified patent and that said Letters Patent are hereby corrected as shown below:

In the heading of the patent:

Change the priority date from "March 28, 1965" to -- March 28, 1967 --

Signed and sealed this 11th day of January 1972.

(SEAL)
Attest:

EDWARD M. FLETCHER, JR.  ROBERT GOTTSCHALK
Attesting Officer  Acting Commissioner of Patents

FORM PO-1050 (10-69)